(12) United States Patent
Frankenberger et al.

(10) Patent No.: US 11,136,050 B2
(45) Date of Patent: Oct. 5, 2021

(54) METHOD FOR SUPPLYING AIR AT A CONTROLLED TEMPERATURE TO A CABIN OF A LAND VEHICLE, AND LAND VEHICLE

(71) Applicant: LIEBHERR-AEROSPACE TOULOUSE SAS, Toulouse (FR)

(72) Inventors: Annekathrin Frankenberger, Vienna (AT); Andreas Krawanja, Vienna (AT); Thierry Mengelle, Pompignan (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 0 days.

(21) Appl. No.: 16/472,459

(22) PCT Filed: Dec. 28, 2017

(86) PCT No.: PCT/EP2017/084746
§ 371 (c)(1),
(2) Date: Jun. 21, 2019

(87) PCT Pub. No.: WO2018/122334
PCT Pub. Date: Jul. 5, 2018

(65) Prior Publication Data
US 2021/0129629 A1    May 6, 2021

(30) Foreign Application Priority Data

Dec. 29, 2016  (FR) ..................... 1663532

(51) Int. Cl.
*B61D 27/00*   (2006.01)
*B60H 1/03*    (2006.01)
*B60H 1/32*    (2006.01)

(52) U.S. Cl.
CPC ......... *B61D 27/0018* (2013.01); *B60H 1/039* (2019.05); *B60H 1/3213* (2013.01);
(Continued)

(58) Field of Classification Search
CPC ........ B61D 27/0018; B60H 1/14; B60H 1/22; B60H 1/3213; B60H 1/039; B60H 1/3232;
(Continued)

(56) References Cited

U.S. PATENT DOCUMENTS 5,724,806 A *   3/1998  Horner ................... F02C 7/185
                                                         60/785
2003/0051492 A1*  3/2003  Hartenstein ............ B64D 13/06
                                                         62/172

FOREIGN PATENT DOCUMENTS

DE    10 2004 063840    4/2006
EP         1177961      2/2002
(Continued)

OTHER PUBLICATIONS

International Search Report dated Mar. 19, 2018.

*Primary Examiner* — Emmanuel E Duke
(74) *Attorney, Agent, or Firm* — IPSILON USA, LLP

(57) ABSTRACT

The invention relates to a method for supplying air at a controlled temperature to a cabin of a surface vehicle in which at least one air cycle device is used, comprising at least one motorized turbocompressor. The air inlet of the turbine is arranged to receive a compressed airflow from the compressor. At least one exchanger is interposed between the air outlet of the compressor and the air inlet of the turbine. The air inlet of the compressor is arranged to receive air at a pressure greater than or equal to atmospheric pressure. The invention likewise relates to a surface vehicle comprising at least one such air cycle device.

13 Claims, 4 Drawing Sheets

(52) U.S. Cl.
CPC ... *B60H 1/3232* (2013.01); *B60H 2001/3255* (2013.01); *B60H 2001/3297* (2013.01)

(58) Field of Classification Search
CPC .... B60H 2001/3255; B60H 2001/3297; Y02T 30/00; B64D 13/06
See application file for complete search history.

(56) References Cited

FOREIGN PATENT DOCUMENTS

| | | | |
|---|---|---|---|
| FR | 2 486 210 | 1/1982 | |
| GB | 2237373 | 5/1991 | |
| GB | 2237373 A | * 5/1991 | ............. B60H 1/321 |

* cited by examiner

METHOD FOR SUPPLYING AIR AT A CONTROLLED TEMPERATURE TO A CABIN OF A LAND VEHICLE, AND LAND VEHICLE

RELATED APPLICATION

This application is a National Phase of PCT/EP2017/084746, filed on Dec. 28, 2017, which claims the benefit of priority from French Patent Application No. 16 63532, filed on Dec. 29, 2016, the entirety of which are incorporated by reference.

BACKGROUND

Field of the Invention

The invention relates to a method for supplying air at a controlled temperature to a cabin of a surface vehicle—in particular a rail vehicle—in which at least one air cycle device is used. It relates to a surface vehicle—in particular a rail vehicle—comprising at least one air cycle device.

Description of Related Art

Throughout the text the following terminology will be adopted:

"surface vehicle" means any transport vehicle moving on the surface of the Earth in the atmosphere and includes in particular wheel-borne (rail vehicles running on rails and road vehicles) and ships (vehicles moving on water); and excluding in particular flying craft such as aircraft, spacecraft and submarines in which the technical problems which arise are very different, in particular owing to the specific requirements for pressurisation of the cabin, "cabin" means any enclosed space of a vehicle in which the temperature of the air must be controlled, and includes in particular cabins for passengers, the driver's cab and baggage compartments or freight compartments with a controlled temperature, "air conditioning" means the act of controlling at least the temperature of the air in a cabin by cooling it or heating it; air conditioning in a cabin may likewise possibly allow at least one other parameter of the air in the cabin to be controlled, in particular selected from humidity, pressure, air flow entering the cabin, air flow exiting the cabin.

The majority of environmental control systems (often designated by the acronym ECS) allowing air conditioning on-board surface vehicles comprise at least one two-phase cycle device (often designated by the acronym VCS), i.e. comprising a liquid/vapour two-phase heat transfer fluid driven in a closed heat loop comprising at least one compressor and one evaporator, the evaporation of the heat transfer fluid causing the production of a cold power allowing cooling of air in the cabin. With these systems, heating is generally performed by electric heaters. It is rarely possible to envisage heating by inversion of the heat pump cycle, taking into account the fact that the ranges of environmental conditions in which the heat pump cycle can operate are relatively limited and insufficient to operate on-board a surface vehicle likely to encounter varied environmental conditions.

These two-phase cycle systems have the disadvantage of requiring heat transfer fluids which are halogeno-carbonaceous (chlorofluorocarbons (CFC), hydrochlorofluorocarbons (HCFC), hydrofluorocarbons (HFC)) or hydrofluoroolefins (HFO) which should no longer be used owing to their harmfulness to the environment and/or their danger to humans (destruction of the ozone layer, high potential for global warming, need to be collected by authorised bodies, toxicity, risk of ignition . . . ). Furthermore, it has proved to be the case that two-phase cycles are poorly adapted to elevated external temperatures and can be interrupted under environmental conditions in which the air conditioning requirements are actually needed the most. This results in considerable discomfort for the passengers, and even risks in terms of safety or preservation of goods.

Consequently, there is a need to propose a method and a device for supplying air at a controlled temperature to a cabin of a surface vehicle based on a single-phase air cycle, i.e. by using only gaseous air as the heat transfer fluid.

Two types of solution have been proposed for this purpose.

In a first type of known solution (EP 0581237), a direct loop air cycle device has been proposed in which fresh air is compressed by a first electric compressor and then passed through a heat exchanger to be intermediately cooled prior to a second compressor driven by a turbine. At the outlet of the second compressor, the air passes through exchangers which allow it to be cooled by external air, and then through a water condenser prior to being supplied to the turbine. The air which is expanded by the turbine passes through an antifreeze mixing chamber and then through a first condenser to cool the air upstream of the turbine in which the water must be condensed, and then through a second condenser in order to be supplied into a mixing chamber where it can be mixed with recirculated air and/or with fresh air before being supplied to the cabin via a filter. However, it has proved to be the case that this first type of solution is not reliable or robust enough in use. In fact, the electric compressors necessary for the first compression stage are fragile components which quickly undergo wear owing to the numerous stops and starts to which they are subjected in use. Furthermore, this solution requires a plurality of rotating machines (first electric compressor stage, turbocompressor, four groups of electric fans) which are bulky, heavy, costly to install and to maintain and require relatively complex control logic.

In a second type of known solution (EP 1177961, EP 1186501), an inverted loop air cycle device has been proposed in which an airflow at atmospheric pressure is supplied to the inlet of a turbine to be expanded and cooled, and then passed through an air/air exchanger in which frigories are exchanged with the forced air within the cabin of the vehicle owing to electric fans. The expanded air is then drawn by a compressor in which it is recompressed to atmospheric pressure to be ejected to the outside.

This second type of solution is generally satisfactory in terms of reliability and performance and has been used for more than 10 years on-board trains, in particular in Germany. However, it has the disadvantage of being relatively bulky, especially in terms of height. In fact, the airflow in the cycle of the turbocompressor which is at a pressure lower than atmospheric pressure (typically of the order of $0.5 \cdot 10^5$ Pa) requires the use of large components: pipes with large cross-sections, volutes with a large diameter, relatively low rotational speed of the turbocompressor. This bulkiness in terms of height can prove to be particularly problematic in particular for rail vehicles in which air conditioning assemblies are generally placed in the roof and for which the total height is limited on the one hand to allow passage beneath bridges or through tunnels and on the other hand to promote the aerodynamics of the vehicle. This is particularly the case for high-speed trains.

Furthermore, in these two types of solution, an electric heater, for which the coefficient of performance is not greater than 1, must be placed downstream of the air/air exchanger to heat the air of the cabin.

DE 102004063840 also describes an air conditioning method and device which can be switched between a cooling mode and a heating mode but the energy performances of which are not optimised.

Objects and Summary

The invention thus aims to overcome all of these disadvantages.

It aims in particular to propose a method for supplying air at a controlled temperature with an air cycle to a cabin of a surface vehicle which is less bulky in terms of height—in particular is compatible with being installed in the roof of rail vehicles—and which is reliable and robust, light, simple, inexpensive to install and to maintain and is efficient under all environmental conditions which may potentially be encountered.

It likewise aims to propose such a method causing the vehicle to have a lower energy consumption, and in particular in which the cabin can be heated with a coefficient of performance greater than 1.

It likewise aims to propose such a method allowing, from the same air cycle device, the hot or cold thermal power production capacity to be easily adjusted based on usage requirements, and the partial redundancy of the air conditioning function in case of partial failure to be ensured. Thus, it aims to propose a method which can easily be adapted to a large number of different surface vehicles having air conditioning requirements which may vary over a wide range, without requiring air conditioning and turbomachine assemblies having to be designed and produced specifically for each application.

The invention likewise aims to propose a surface vehicle having the same advantages.

The invention thus relates to a method for supplying air at a controlled temperature to a cabin of a surface vehicle—in particular a rail vehicle—in which at least one air cycle device is used, comprising:
  at least one turbocompressor comprising:
  a rotating compressor,
  a rotating turbine,
  a shaft coupling the turbine and the compressor such that the turbine is able to rotationally drive the compressor,
  an air inlet of the compressor,
  an air outlet of the compressor delivering an airflow compressed by the compressor,
  an air inlet of the turbine arranged to receive a compressed airflow from the compressor,
  an air outlet of the turbine delivering an expanded cold airflow,
  at least one exchanger interposed between the air outlet of the compressor and the air inlet of the turbine, characterised in that:
  use is made of at least one turbocompressor of at least one air cycle device—in particular each turbocompressor of at least one air cycle device, more particularly each turbocompressor of each air cycle device—comprising an electric motor coupled to the compressor—in particular interposed on a shaft between the turbine and the compressor—so as to be able to deliver mechanical power to the compressor,
  the air inlet of the compressor is arranged to receive air at a pressure greater than or equal to atmospheric pressure.

In some advantageous embodiments, a method in accordance with the invention is likewise characterised by all or some of the features mentioned below:
  the turbine of each turbocompressor is arranged to deliver an expanded airflow at a pressure greater than or equal to atmospheric pressure,
  each turbocompressor of each air cycle device is associated with a set of controlled valves and conduits, adapted to be able to be controlled in one operating mode selected at least from:
    a heating mode in which the compressed and heated air delivered at the outlet of the compressor of the turbocompressor passes through at least one first circuit ("hot pass") of a heat exchanger adapted to heat an airflow for supply to the cabin of the vehicle,
    a cooling mode in which:
    the air inlet of the compressor is arranged to receive air external to the vehicle,
    the compressed air outlet of the compressor is connected to at least one heat exchanger, named intermediate exchanger, delivering a compressed air stream cooled by at least one air stream selected from an external air stream, a foul air stream to be vented out of the cabin, and mixtures thereof,
    the air inlet of the compressor is arranged, in the cooling mode, to directly receive air drawn from the outside of the vehicle,
    in the cooling mode, the expanded cold airflow delivered by the air outlet of the turbine is introduced into the cabin of the vehicle, mixed with the recirculation air from the cabin, and possibly with fresh air,
    in the heating mode, said airflow for supply to the cabin of the vehicle is formed by at least one air stream selected from an external air stream, a recirculation air stream from the cabin of the vehicle, and mixtures thereof, this air stream passing through the second circuit of the cabin heat exchanger to be heated,
    in a first variant, in the heating mode by heat pump:
    the air inlet of the compressor is arranged to receive an expanded airflow from the turbine via at least one heat exchanger, named intermediate heating exchanger, adapted to heat the expanded air delivered by the turbine in contact with at least one air stream—in particular in contact with an air stream—selected from an external air stream, a foul air stream to be vented out of the cabin, and mixtures thereof,
    the compressed and heated air delivered to the outlet of the compressor of the turbocompressor passes through a first circuit ("hot pass") of a heat exchanger, named cabin heat exchanger, adapted to heat an airflow for supply to the cabin of the vehicle passing through a second circuit ("cold pass") of the cabin heat exchanger, an outlet of the first circuit of the cabin heat exchanger being connected to the air inlet of the turbine,
    in a second variant in the heating mode:
    said set of controlled valves and conduits is adapted to be able to be controlled likewise in an operating mode selected from a heating mode in which:
    a foul air stream to be vented out of the cabin is supplied to the inlet of the compressor of the turbocompressor,
    the compressed and heated air delivered to the outlet of the compressor of the turbocompressor passes through at least one exchanger interposed between the air outlet of the compressor of at least one turbocompressor and the air inlet of the turbine of the turbocompressor, and the air delivered at the outlet of the turbine of the turbocompressor is connected to an outlet orifice to be ejected to the outside, the rotational speed of the electric motor of each turbocompressor is controlled based on a set thermal power to be delivered to the cabin of the vehicle, in the cooling mode, the rotational speed of the electric motor of each turbocompressor is controlled based on a set cold power at the outlet of the turbine, in the heating mode, the rotational speed of the electric motor of each turbocompressor is controlled based on a set hot power at the outlet of the compressor, the rotational speed of the electric motor of each turbocompressor is controlled with a maximum value greater than 50,000 rpm, in particular with a maximum value between 50,000 rpm and 100,000 rpm, e.g. of the order of 65,000 rpm, the moisture of the compressed air delivered to the air inlet of the turbine is extracted upstream of this air inlet; this extraction can be carried out by a moisture extraction loop successively comprising a first circuit ("hot pass") of a heating heat exchanger receiving the airflow which is compressed and cooled at the outlet of the intermediate cooling exchanger, a first circuit ("hot pass") of a condensing heat exchanger, a liquid water extraction device, a second circuit ("cold pass") of the heating heat exchanger receiving the airflow delivered downstream of the liquid water extraction device to heat it by the compressed airflow supplying the first circuit of the heating heat exchanger, a second circuit ("cold pass") of the condensing heat exchanger receiving the expanded cold airflow delivered by the air outlet of the turbine to cool the compressed airflow passing through the first circuit of the condensing heat exchanger so as to condense the moisture present in this compressed airflow, each turbocompressor is selected such that it has a maximum diameter (volute) less than 400 mm, e.g. between 300 mm and 400 mm, in particular of the order of 360 mm, each turbocompressor is selected such that it has a weight less than 50 kg, e.g. between 20 kg and 50 kg, in particular of the order of 30 kg.

The invention likewise relates to a surface vehicle—in particular rail vehicle—comprising at least one air cycle device, comprising:

at least one turbocompressor comprising:
a rotating compressor,
a rotating turbine,
a shaft coupling the turbine and the compressor such that the turbine is able to rotationally drive the compressor,
an air inlet of the compressor,
an air outlet of the compressor delivering an airflow compressed by the compressor,
an air inlet of the turbine arranged to receive a compressed airflow from the compressor,
an air outlet of the turbine delivering an expanded cold airflow,
at least one exchanger interposed between the air outlet of the compressor of at least one turbocompressor and the air inlet of the turbine of at least one turbocompressor, characterised in that:
at least one turbocompressor of at least one air cycle device—in particular each turbocompressor of at least one air cycle device, more particularly each turbocompressor of each air cycle device—comprises an electric motor coupled to the compressor—in particular interposed on a shaft between the turbine and the compressor—so as to be able to deliver mechanical power to the compressor, the air inlet of the compressor of at least one turbocompressor of at least one air cycle device—in particular each turbocompressor of at least one air cycle device, more particularly each turbocompressor of each air cycle device—is arranged to receive air at a pressure greater than or equal to atmospheric pressure.

In some advantageous embodiments, a vehicle in accordance with the invention is likewise characterised by all or some of the features mentioned below:
the turbine of each turbocompressor is arranged to deliver an expanded airflow at a pressure greater than or equal to atmospheric pressure,
each air cycle device comprises a set of controlled valves and conduits and the vehicle comprises at least one control unit adapted to be able to control each air cycle device in an operating mode selected at least from:
a heating mode in which the compressed and heated air delivered at the outlet of the compressor of the turbocompressor passes through at least one first circuit ("hot pass") of a heat exchanger adapted to heat an airflow for supply to the cabin of the vehicle,
a cooling mode in which:
the air inlet of the compressor is arranged to receive air external to the vehicle,
the compressed air outlet of the compressor is connected to at least one heat exchanger, named intermediate cooling exchanger, delivering a compressed air stream cooled by at least one air stream selected from an external air stream, a foul air stream to be vented out of the cabin, and mixtures thereof,
the air inlet of the compressor is arranged, in the cooling mode, to directly receive air drawn from the outside of the vehicle,
in a first variant, in the heating mode by heat pump:
the air inlet of the compressor is arranged to receive an expanded airflow from the turbine via at least one heat exchanger, named intermediate heating exchanger, adapted to heat the expanded air delivered by the turbine in contact with an air stream selected from an external air stream, a foul air stream to be vented out of the cabin, and mixtures thereof,
the compressed and heated air delivered to the outlet of the compressor of the turbocompressor passes through a first circuit ("hot pass") of a heat exchanger, named cabin heat exchanger, adapted to heat an airflow for supply to the cabin of the vehicle passing through a second circuit ("cold pass") of the cabin heat exchanger, an outlet of the first circuit of the cabin heat exchanger being connected to the air inlet of the turbine,
said intermediate cooling exchanger and said at least one intermediate heating exchanger are formed by the same heat exchanger,
in a second variant in the heating mode:
said set of controlled valves and conduits is adapted to be able to be controlled likewise in an operating mode selected from a heating mode in which:
a foul air stream to be vented out of the cabin is supplied to the inlet of the compressor of the turbocompressor,
the compressed and heated air delivered to the outlet of the compressor of the turbocompressor passes through at least one exchanger interposed between the air outlet of the compressor of at least one turbocompressor and the air inlet of the turbine of the turbocompressor,
and the air delivered at the outlet of the turbine of the turbocompressor is connected to an outlet orifice to be ejected to the outside, it comprises a control unit adapted to control the rotational speed of the electric motor of each turbocompressor based on a set thermal power to be delivered to the cabin of the vehicle, at least one—in particular each—turbocompressor has a maximum diameter (volute) less than 400 mm, e.g. between 300 mm and 400 mm, in particular of the order of 360 mm, at least one—in particular each—turbocompressor has a weight less than 50 kg, e.g. between 20 kg and 50 kg, in particular of the order of 30 kg, at least one—in particular each—turbocompressor is adapted to be able to be controlled with a maximum rotational speed greater than 50,000 rpm, in particular between 50,000 rpm and 100,000 rpm, e.g. of the order of 65,000 rpm, at least one—in particular each—air cycle device comprises an extraction device, upstream of the air inlet of the turbine, for extracting the moisture from the compressed air delivered, in the cooling mode, to the compressed air outlet of the compressor; in some embodiments, this extraction device comprises a moisture extraction loop successively comprising a first circuit ("hot pass") of a heating heat exchanger connected to the intermediate cooling exchanger to be able to receive the compressed (and cooled) airflow delivered by this intermediate heat exchanger, a first circuit ("hot pass") of a condensing heat exchanger, a liquid water extraction device, a second circuit ("cold pass") of the heating heat exchanger connected to the liquid water extraction device to be able to receive the airflow delivered downstream of the liquid water extraction device for heating it by the compressed airflow supplying the first circuit of the heating heat exchanger, a second circuit ("cold pass") of the condensing heat exchanger connected to the outlet of the turbine to be able to receive the expanded cold airflow delivered by the air outlet of the turbine, and to cool the compressed airflow passing through the first circuit of the condensing heat exchanger so as to condense the moisture present in this compressed airflow.

Thus, in a method and a vehicle in accordance with the invention, the air conditioning is obtained by at least one motorised turbocompressor, the compressor of which receives air at a pressure greater than or equal to atmospheric pressure. The result in particular is not only a simplification in the architecture and components without using two-phase heat transfer fluid but also the possibility of considerably reducing the airflow in the loop and the dimensions of pipes and valves.

In the cooling mode, the airflow through the loop can be limited to the fresh airflow to be provided to the cabin. It is thus typically divided by 2 compared with the airflow through the inverted loop of the second type of solution of the prior art mentioned above. Furthermore, the pressures in the loop typically pass from a value of the order of $0.5 \cdot 10^5$ Pa to a value of the order of $3 \cdot 10^5$ Pa, i.e. multiplied by 6. The result is that the diameter of the air circulation conduits in the loop can be divided by a factor typically equal to $\sqrt{12}=3.4$.

Another result is the possibility of using the loop of the air cycle and at least one turbocompressor of each air cycle device with a heat pump for heating the cabin, in particular by inverting the circulation direction of the air in the loop. In fact, it proves to be the case that with a direct loop air cycle in accordance with the invention, the pressures and operating points of the compressor and the turbine of the turbocompressor are substantially the same in the cooling mode and heating mode. It is thus possible to generate a hot thermal power with a yield greater than 1. The inventors have thus determined that it is possible to obtain a coefficient of performance typically of the order of 1.25, i.e. a gain of 25% to 30% compared with an electric heater. Likewise, the vast majority of the components used in the cooling mode are also reused in the heating mode. Furthermore, it is possible to collect in the intermediate exchanger in the heating mode the calories in the foul air vented from the cabin, or in the cooling mode the frigories in the foul air vented from the cabin.

Furthermore, the exchangers can be cooled using simple electric fans.

In certain embodiments of a method and a vehicle in accordance with the invention, each air cycle device comprises one and only one turbocompressor, and can be configured and set while being produced in the factory, the installation on-board the vehicle being limited to connecting the air inlets and the air outlets of the air cycle device to the corresponding conduits of the vehicle. The number of air cycle device(s) and/or the number of turbocompressor(s) can be adjusted based on the required thermal power for each vehicle. In particular, a vehicle in accordance with the invention comprises for example advantageously a plurality of air cycle devices—in particular between 2 and 10 air cycle devices each comprising one and only one turbocompressor. Therefore, the inventors have shown that in reality it is preferable to provide several air cycle devices with smaller dimensions each incorporating a motorised turbocompressor controlled at a high rotational speed which, even though they are more costly and complex to produce, allow a saving to be made in energy consumption and they are easier to install on-board a surface vehicle such as a rail vehicle, largely compensating for the increased cost of manufacturing the turbocompressors.

The invention likewise relates to a method for supplying air at a controlled temperature implemented in a surface vehicle in accordance with the invention. It likewise relates to a surface vehicle in which a method for supplying air at a controlled temperature in accordance with the invention is implemented.

The invention likewise relates to a method for supplying air at a controlled temperature and a surface vehicle which are characterised, in combination or individually, by all or some of the features mentioned above or below. However they are formally presented, unless explicitly stated otherwise, the different features mentioned above or below should not be considered to be closely or inextricably linked with each other, the invention being able to relate to only one of these structural or functional features, or only part of one of these structural or functional features, or even any group, combination or juxtaposition of all or some of these structural or functional features.

BRIEF DESCRIPTION OF THE DRAWINGS

Other aims, features and advantages of the invention will become apparent upon reading the following description given by way of non-limiting example and which makes reference to the attached figures in which.

DETAILED DESCRIPTION

Figure 1:
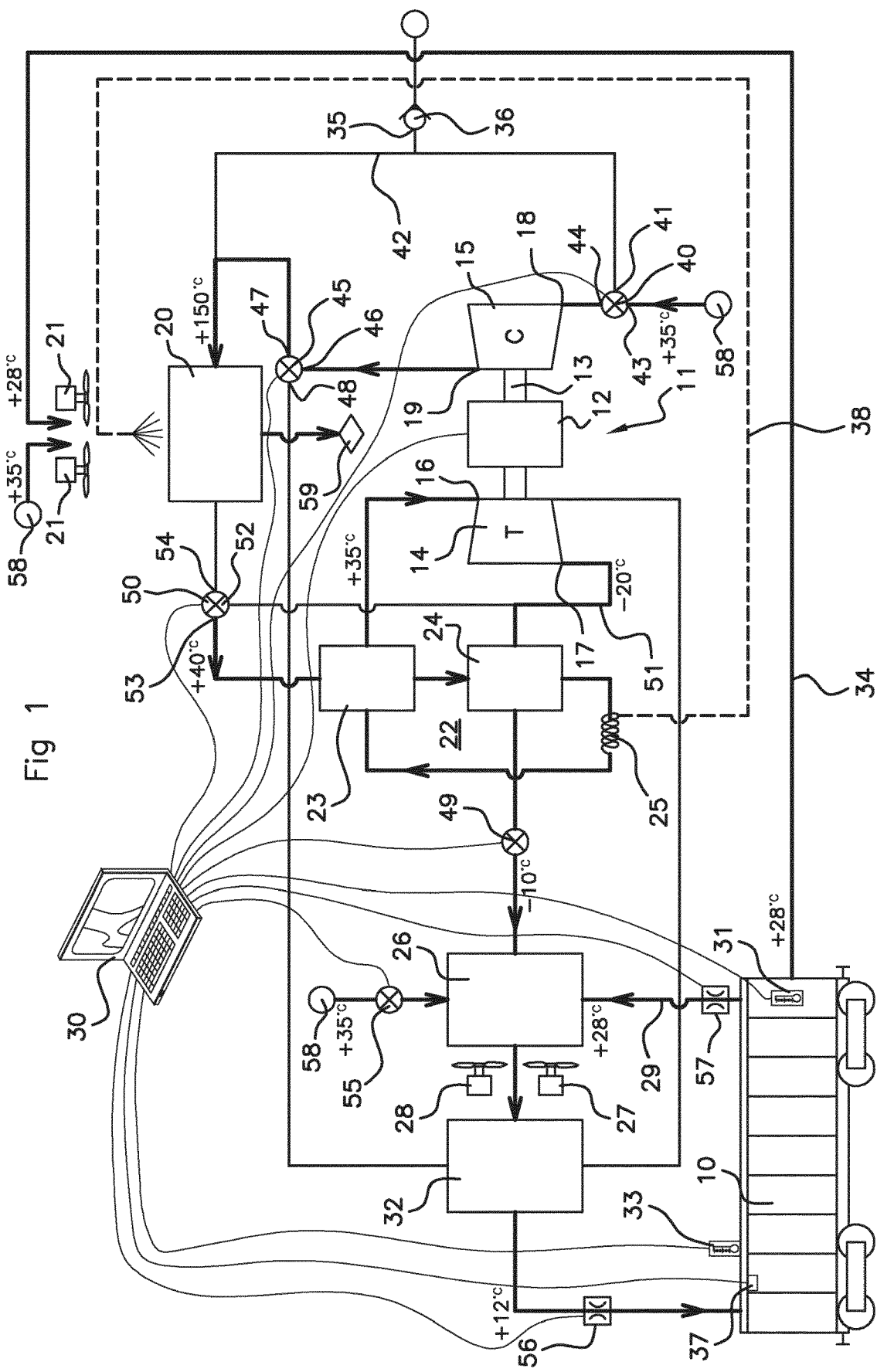
FIG. 1 is an operating diagram illustrating an air cycle device of a vehicle in accordance with a first embodiment of the invention implementing a method in accordance with a first embodiment of the invention in the cooling mode.

The air cycle device in accordance with the invention shown in the figures allows the environmental control (air conditioning by cooling or heating) of a cabin 10 of a surface vehicle in accordance with the invention. It comprises a turbocompressor 11 motorised by an electric motor 12 driving a shaft 13 of the turbocompressor 11 coupled to a rotary turbine 14 and to a rotary compressor 15. Such a motorised turbocompressor 11 is known per se and can be the object of numerous design variants, in particular with respect to the type of turbine (axial or radial), the type of compressor (axial or radial), the type of electric motor, the mounting of the shaft and bearings (e.g. aerodynamic bearings or magnetic bearings), the relative arrangement of the wheels and/or the motor.

In the case of a surface vehicle such as a rail vehicle, e.g. for high-speed trains, the turbocompressor 11 can advantageously be selected with the following features, given solely by way of non-limiting example:

turbine 14 and compressor 15 of the radial type, aerodynamic or magnetic bearings, maximum rotational speed between 50,000 rpm and 100,000 rpm, e.g. of the order of 65,000 rpm, maximum compression ratio of the compressor: between 2.5 and 5, in particular of the order of 3.2, maximum expansion ratio of the turbine: between 2 and 5, electric motor: nominal power between 10 kW and 100 kW, in particular of the order of 40 kW, maximum volute diameter (volute of the compressor 15) less than 500 mm, e.g. between 300 mm and 500 mm, in particular of the order of 360 mm, maximum wheel diameter of the compressor 15 less than 250 mm, e.g. between 100 and 250 mm, in particular of the order of 150 mm, weight less than 50 kg, e.g. between 15 kg and 50 kg, in particular of the order of 30 kg, diameter of the bearings, in particular in the case of air bearings, between 30 mm and 50 mm, in particular of the order of 40 mm.

The turbine 14 has an air inlet 16 and an outlet 17 for expanded and cooled air. The compressor 15 comprises an air inlet 18 and an outlet 19 for compressed and heated air.

A first circuit of an intermediate air/air exchanger 20 is interposed between the compressor 15 and the turbine 14.

This intermediate exchanger 20 has a second air circuit supplied by an air stream driven by at least one electric fan 21. This air stream can be formed from an ambient external air stream drawn from outside the vehicle at ambient temperature, from a foul air stream vented from the cabin 10 (in particular for renewing the air in the cabin 10) via a conduit 34, and mixtures thereof. The air stream passing into the second air circuit of the intermediate exchanger 20 is thus at a temperature between the temperature outside the vehicle and the temperature prevailing in the cabin 10. After passing into the second air circuit of the intermediate exchanger 20, this air stream is ejected to the outside.

A moisture extraction loop 22 is interposed between the first circuit of the intermediate exchanger 20 and the turbine 14. This moisture extraction loop 22 successively comprises, from the intermediate exchanger 20, a first circuit of a heating air/air heat exchanger 23, a first circuit of a condensing air/air heat exchanger 24, a liquid water extraction device 25, a second heating circuit 23, the outlet of which is connected to the inlet of the turbine 14. The outlet of the turbine 14 is connected to a second circuit of the condenser 24, this latter supplying a mixing chamber 26 supplying the cabin 10. The mixing chamber 26 can likewise receive on the one hand a recirculation air stream extracted from the cabin 10 by electric fans 27, 28 and, on the other hand a fresh air stream drawn from outside the vehicle, owing to these electric fans 27, 28 if the cold thermal power required in the cabin 10 is such that the airflow delivered by the turbine 14 is insufficient to cover the requirement for renewing air in the cabin 10.

The air outlet 19 of the compressor 15 can be connected to the air inlet 16 of the turbine 14 via a first circuit of an air/air heat exchanger, named cabin heat exchanger 32, the second circuit of which is interposed between the mixing chamber 26 and the cabin 10.

Each heat exchanger 20, 23, 24, 32 allows heat to be transferred between its first circuit (first "pass") and its second circuit (second "pass"), as a function of the difference in temperature of the air streams respectively passing through these two circuits.

A control unit 30 comprising in particular an automatic electronic and/or computing arrangement and a power converter allows the electric motor 12 to be controlled at a determined rotational speed by a closed-loop control based on the cold or hot thermal power to be delivered in the cabin 10, itself determined based on the temperature measured in the cabin 10 by a temperature sensor 31, and a set temperature determined by a user of the vehicle. This control is performed by the control unit 30 in accordance with a closed-loop control with a law for controlling the rotational speed of the motor based on the temperature of the air delivered to the inlet of the mixing chamber 26, itself determined based on the set temperature, the temperature measured in the cabin 10 and temperatures and airflows entering the mixing chamber 26 and exiting same. The airflow entering the cabin 10 is measured by an airflow sensor 56. The airflow exiting the cabin 10 is measured by an airflow sensor 57. These airflows are also controlled by the control unit 30, in particular based on an amount of fresh renewed air to be provided in the cabin 10 which can be itself determined by a carbon dioxide sensor 37 in the cabin 10 allowing the occupation thereof to be estimated.

The air cycle device likewise comprises a set of controlled valves and conduits and the control unit 30 is likewise connected to each of the controlled valves to control the state thereof so as to select an operating mode of the air cycle device from among a cooling mode and a heating mode, this operating mode being able to be selected manually by the user or determined automatically by the control unit 30 itself based in particular on the difference between the temperature measured within the cabin 10 and the external temperature measured by a temperature sensor 33 connected to the control unit 30.

Figure 2:
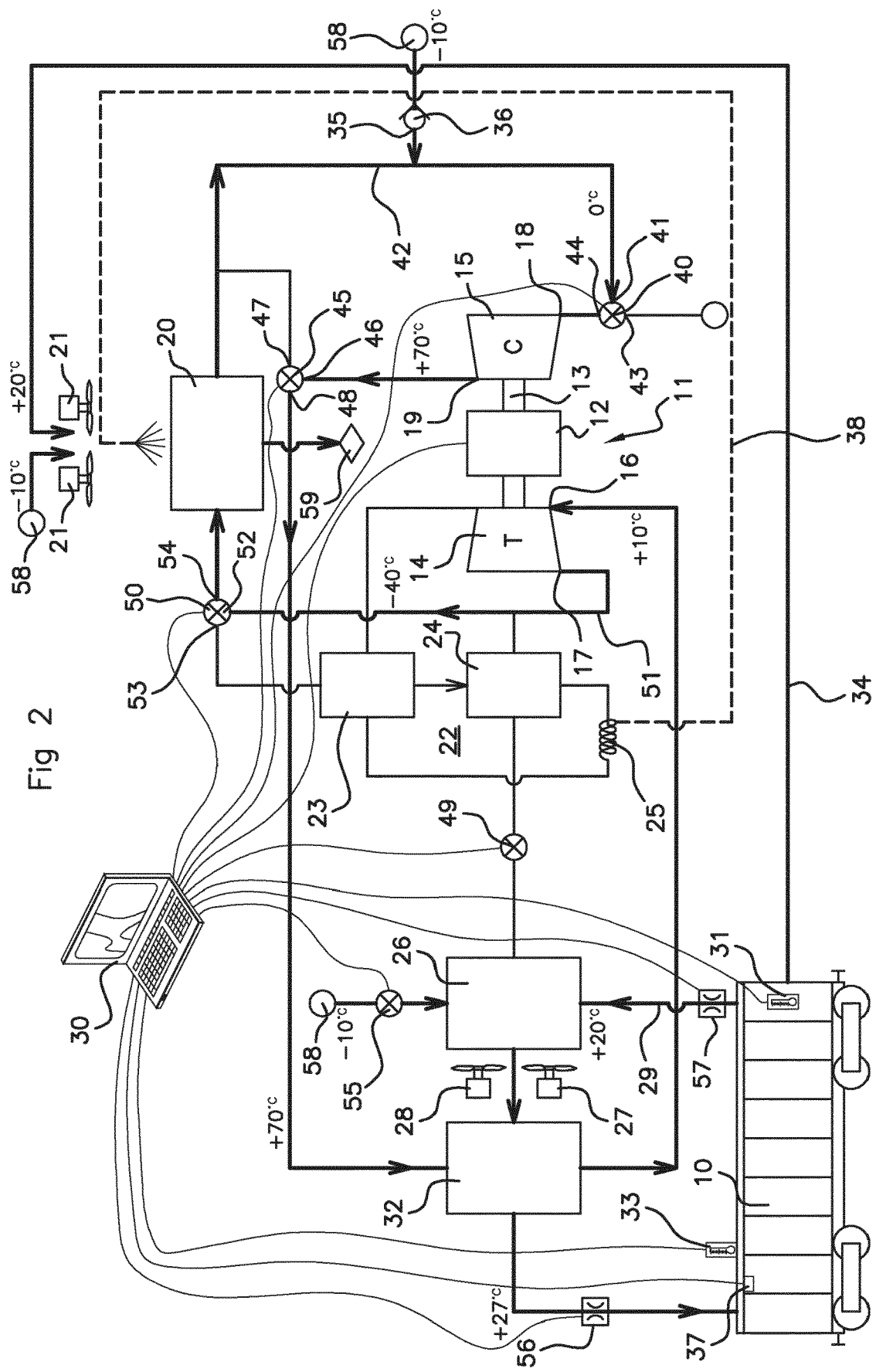
FIG. 2 is an operating diagram of the air cycle device of FIG. 1 in the heating mode.

In the first embodiment illustrated in FIGS. 1 and 2, the air inlet 18 of the compressor 15 comprises a controlled three-way valve 40, of which one inlet 41 is connected by a conduit 42 to the first circuit of the intermediate exchanger 20, one inlet 43 is supplied with external fresh air 38, and having an outlet 44 connected to the air inlet 18 of the compressor 15.

The air outlet 19 of the compressor 15 is connected to an inlet 46 of a controlled three-way valve 45, of which one outlet 47 is connected to the conduit 42 leading to the first circuit of the intermediate exchanger 20 (conduit 42 connecting the air inlet 18 of the compressor 15 to the first circuit of the intermediate exchanger 20), and one outlet 48 is connected to the first circuit of the cabin heat exchanger 32.

A controlled valve 49 is interposed between the air outlet 17 of the turbine 14 and the mixing chamber 26, for example between the outlet of the second circuit of the condensing heat exchanger 24 and the inlet of the mixing chamber 26.

A controlled three-way valve 50 is interposed between the first circuit of the intermediate exchanger 20 and a conduit 51 connecting the air outlet 17 of the turbine 14 to the first circuit of the condensing heat exchanger 24. This valve 50 comprises an inlet 52 connected to the conduit 51; an outlet 53 connected to the inlet of the moisture extraction loop 22, i.e. to the first circuit of the heating heat exchanger 23; and an inlet/outlet 54 connected to the first circuit of the intermediate exchanger 20.

A controlled valve 55 allows the mixing chamber 26 to be supplied with external fresh air 58.

The control logic of such a control unit 30 of an air cycle device is furthermore well known per se and can be the object of any design variants.

In the figures, the conduits in which the air circulates are shown in thicker lines than those in which the air does not circulate, according to the selected operating mode.

In the cooling mode, the control unit 30 places the different controlled valves 40, 45, 49, 50, 55 in the state shown in FIG. 1.

The valve 40 connects its inlet 43 to its outlet 44 and its inlet 41 is closed. The air inlet 18 of the compressor 15 receives external fresh air 58 drawn directly at atmospheric pressure or at dynamic pressure resulting from the movement of the vehicle at a pressure greater than atmospheric pressure. It should be noted in this regard that the air cycle device has no other electric compressor, the compression of the air in the loop being obtained exclusively and entirely by the compressor 15 of the turbocompressor 11.

The valve 45 connects its inlet 46 to its outlet 47 connected to the first circuit of the intermediate exchanger 20 and its other outlet 48 is closed. The air outlet 19 of the compressor 15 supplies the first circuit of the intermediate exchanger 20 which forms the hot pass of this intermediate exchanger 20, the compressed airflow heated by the compressor 15 being cooled in this intermediate exchanger 20 by the airflow circulating in the second circuit of the intermediate exchanger 20 which forms the cold pass thereof. The second air circuit of the intermediate exchanger 20 is supplied by an air stream driven by at least one electric fan 21. This air stream can be selected from an external air stream 58 drawn from outside the vehicle at ambient temperature, a foul air stream vented from the cabin 10 (in particular for renewing the air in the cabin 10) via the conduit 34, and mixtures thereof. The air stream passing into the second air circuit of the intermediate exchanger 20 is thus at a temperature between the temperature outside the vehicle and the temperature prevailing in the cabin 10. After passing into the second air circuit of the intermediate exchanger 20, this air stream is ejected to the outside via an outlet orifice 59.

The airflow which is compressed and cooled at the outlet of the first circuit of the intermediate exchanger 20 is supplied into the first circuit of the heater 23 and then into the moisture extraction device 25 and then into the second circuit of the heater 23 and then to the air inlet 16 of the turbine 14 in which it is cooled and expanded. The intermediate exchanger 20 is thus, in this cooling mode, an intermediate exchanger 20 cooling the compressed air delivered by the compressor 15. The valve 50 connects the first circuit of the intermediate exchanger 20 to the first circuit of the heater 23, and the inlet 52 of the valve 50 connected to the outlet conduit 51 of the turbine 14 is closed.

The expansion in the turbine 14 likewise allows mechanical work to be created which is added to that of the electric motor to rotationally drive the compressor and to trigger the start-up cycle. The turbine 14 thus allows the mechanical work delivered to the compressor 15 to be increased, the rotational speed of the motor 12 being adjusted by the control unit 30 to obtain a temperature value at the outlet of the turbine 14 which is appropriate for cooling the air of the cabin 10, typically of the order of −10° C.

The valve 49 is open such that the air exiting the turbine 14 supplies the mixing chamber 26 via the second circuit of the condenser 24. The valve 55 is assumed to be closed for the nominal point of operation. It can be opened to a greater or lesser extent based on an amount of external fresh airflow 58 necessary for supplying the cabin with dioxygen. The airflow cooled and expanded by the turbine 14 passing into the second circuit of the condenser 24 allows the temperature of the airflow passing into the first circuit of this condenser 24 to be lowered to a value allowing condensation of the water. The water extracted by the moisture extraction device 25 is advantageously introduced via a conduit 38 into the second circuit of the intermediate exchanger 20 to be evaporated therein and to contribute to lowering the cooling temperature. The heater 23 then allows the heat energy of the air stream to be recovered at the outlet of the intermediate exchanger 20 by heating the airflow exiting the first circuit of the condenser 24 prior to being introduced into the turbine 14.

The mixing chamber 26 is likewise supplied with recirculation air from the cabin via the conduit 29 by the fans 27, 28 which likewise supply the cabin 10 with air from the mixing chamber 26 via the second circuit of the cabin heat exchanger 32 which is inactive, the first circuit of this cabin heat exchanger 32 not being supplied.

Therefore, in the cooling mode, the air cycle device performs an air cycle with a direct open loop from the motorised turbocompressor 11. The pressure in the loop corresponds to that delivered by the compressor 15, greater than atmospheric pressure, typically of the order of $3 \cdot 10^5$ Pa.

In the heating mode, the control unit 30 places the different controlled valves 40, 45, 49, 50, 55 in the state shown in FIG. 2.

The valve 40 connects its inlet 41 to its outlet 44 and its inlet 43 is closed. The valve 50 connects its inlet 52 connected to the air outlet 17 of the turbine 14 to the inlet/outlet 54 connected to the first circuit of the intermediate exchanger 20, and the outlet 53 of the valve 50 connected to the heater 23 is closed. The valve 49 is closed. The air inlet 18 of the compressor 15 thus receives an expanded airflow from the turbine 14 via the first circuit of the intermediate exchanger 20, adapted to heat the expanded and cooled air delivered by the turbine 14 in contact with an air stream passing through the second circuit of the intermediate exchanger 20, this latter being at a temperature between the temperature outside the vehicle and the temperature prevailing in the cabin 10.

A conduit 35 is connected in parallel to the air inlet 18 of the compressor 15, i.e. in the illustrated example to the conduit 42, preferably via a check valve 36 to allow the introduction of external fresh air 58 into the loop by being sucked in by the compressor 15 based on leaks occurring in the loop and in the turbocompressor 11. The pressure of the air at the air inlet 18 of the compressor 15 is equal to atmospheric pressure.

The valve 45 connects its inlet 46 to its outlet 48 connected to the first circuit of the cabin heat exchanger 32 and its other outlet 47 is closed. The air outlet 19 of the compressor 15 is connected to the air inlet 16 of the turbine 14 via the first circuit of the cabin heat exchanger 32, the second circuit of which is interposed between the mixing chamber 26 and the cabin 10 such that an air stream delivered by the mixing chamber 26 is heated in this cabin heat exchanger 32 by the calories of compressed hot air passing through the first circuit of the cabin heat exchanger 32. This air stream delivered by the mixing chamber 26 is formed by the mixture of recirculation air from the cabin 10 connected to the mixing chamber via a conduit 29 and of external fresh air 58 supplied in the mixing chamber 26 by the valve 55 which is open. The fans 27, 28 ensuring the mixing and flowing of the air at the outlet of the mixing chamber 26.

After passing into the turbine 14, the air is expanded and cooled to a temperature much lower than the temperature of the cabin and the external temperature, typically of the order of −40° C. The expansion in the turbine is accompanied with the creation of mechanical work which is added to that of the electric motor 12 to rotationally drive the compressor 15.

The first circuit of the intermediate air/air exchanger 20 is interposed between the turbine 14 and the compressor 15. It receives the expanded and cooled airflow from the turbine 14 to heat it prior to delivering it to the air inlet 18 of the compressor 15. The second air circuit of the intermediate exchanger 20 is supplied by an air stream driven by at least one electric fan 21. This air stream can be selected from an external air stream 58 drawn from outside the vehicle at ambient temperature, a foul air stream vented from the cabin 10 (in particular for renewing the air in the cabin 10) via the conduit 34, and mixtures thereof. The air stream passing into the second air circuit of the intermediate exchanger 20 is thus at a temperature between the temperature outside the vehicle and the temperature prevailing in the cabin 10. After passing into the second air circuit of the intermediate exchanger 20, this air stream is ejected to the outside by the outlet orifice 59. In the heating mode, the intermediate exchanger 20 is thus an intermediate heating exchanger 20.

Tables 1 and 2 below show, by way of non-limiting example, different typical values for flow rate, pressure and temperature at the air inlets and outlets of the turbine 14 of the compressor 15 of the turbocompressor 11 which can be obtained in the first embodiment of the invention.

TABLE 1

| | Parameters | | |
|---|---|---|---|
| Cooling mode | Temperature | Pressure ($10^5$ Pa) | Flow rate |
| Compressor inlet | 35° C. | 1 | 0.4 kg/s |
| Compressor outlet | 183° C. | 3.1 | 0.4 kg/s |
| Turbine inlet | 35° C. | 3.05 | 0.39 kg/s |
| Turbine outlet | −19° C. | 1.05 | 0.39 kg/s |

TABLE 2

| | Parameters | | |
|---|---|---|---|
| Heating mode | Temperature | Pressure ($10^5$ Pa) | Flow rate |
| Compressor inlet | 0° C. | 1 | 0.3 kg/s |
| Compressor outlet | 100° C. | 2.5 | 0.3 kg/s |
| Turbine inlet | 10° C. | 2.45 | 0.3 kg/s |
| Turbine outlet | −40° C. | 1.05 | 0.3 kg/s |

Other typical temperature values are shown in FIGS. 1 and 2. Thus, in the heating mode the air cycle device performs an inverted closed loop cycle forming a heat pump with the turbocompressor 11, the stages of this turbocompressor 11 having substantially the same operating conditions as in the cooling mode, the fan circuits being the same as in the cooling mode. The hot thermal power is thus generated with a yield greater than 1.

Furthermore, the operating pressures in the different parts of the air cycle device are all greater than atmospheric pressure, which allows the cross-sections and dimensions of the conduits and components (valves, volutes and wheels of the turbocompressor . . . ) to be reduced and thus allows the general bulkiness and costs of each air cycle device to be reduced.

Figure 3:
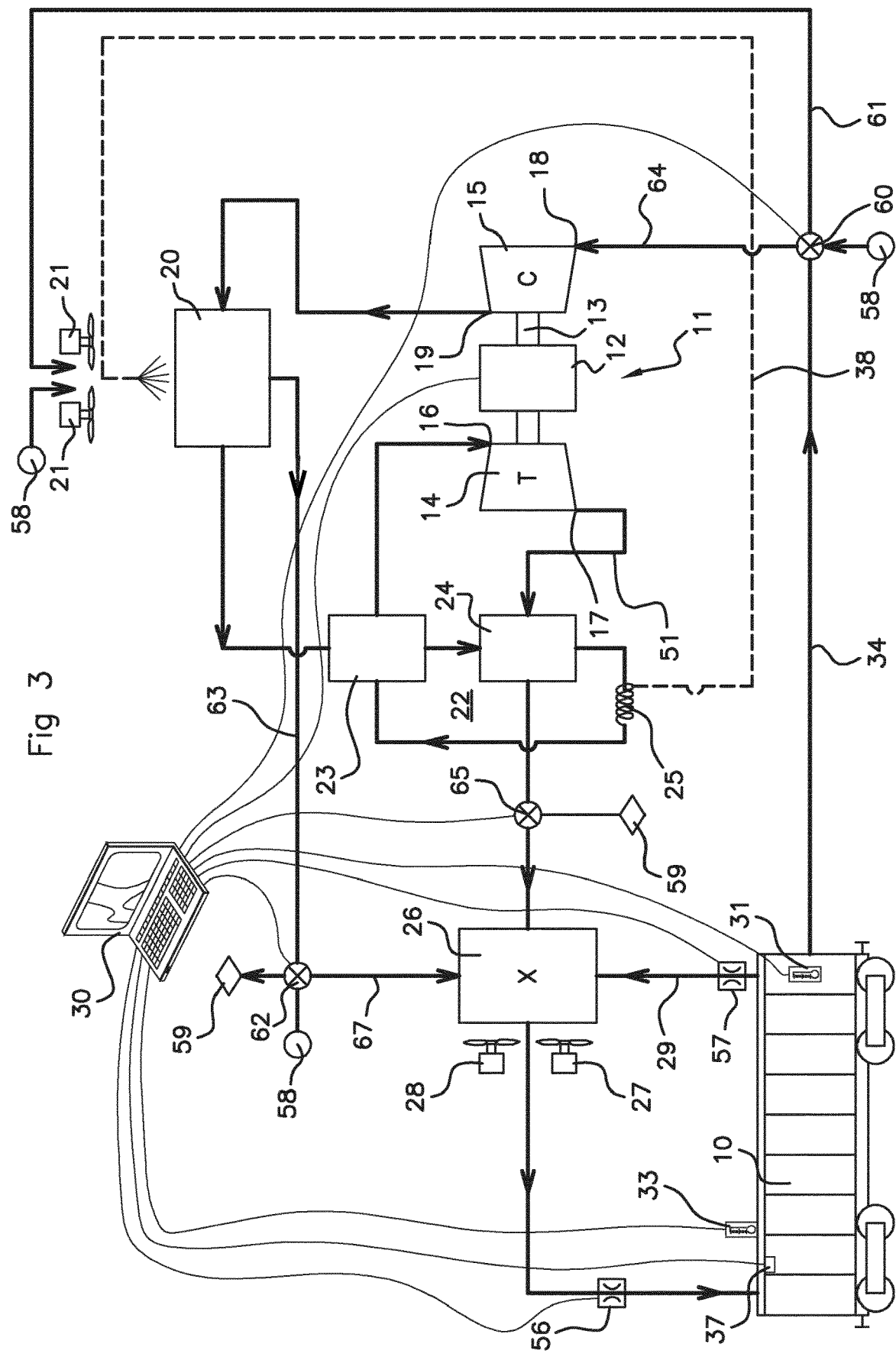
FIG. 3 is an operating diagram illustrating an air cycle device of a vehicle in accordance with a second embodiment of the invention implementing a method in accordance with a second embodiment of the invention in the cooling mode.
Figure 4:
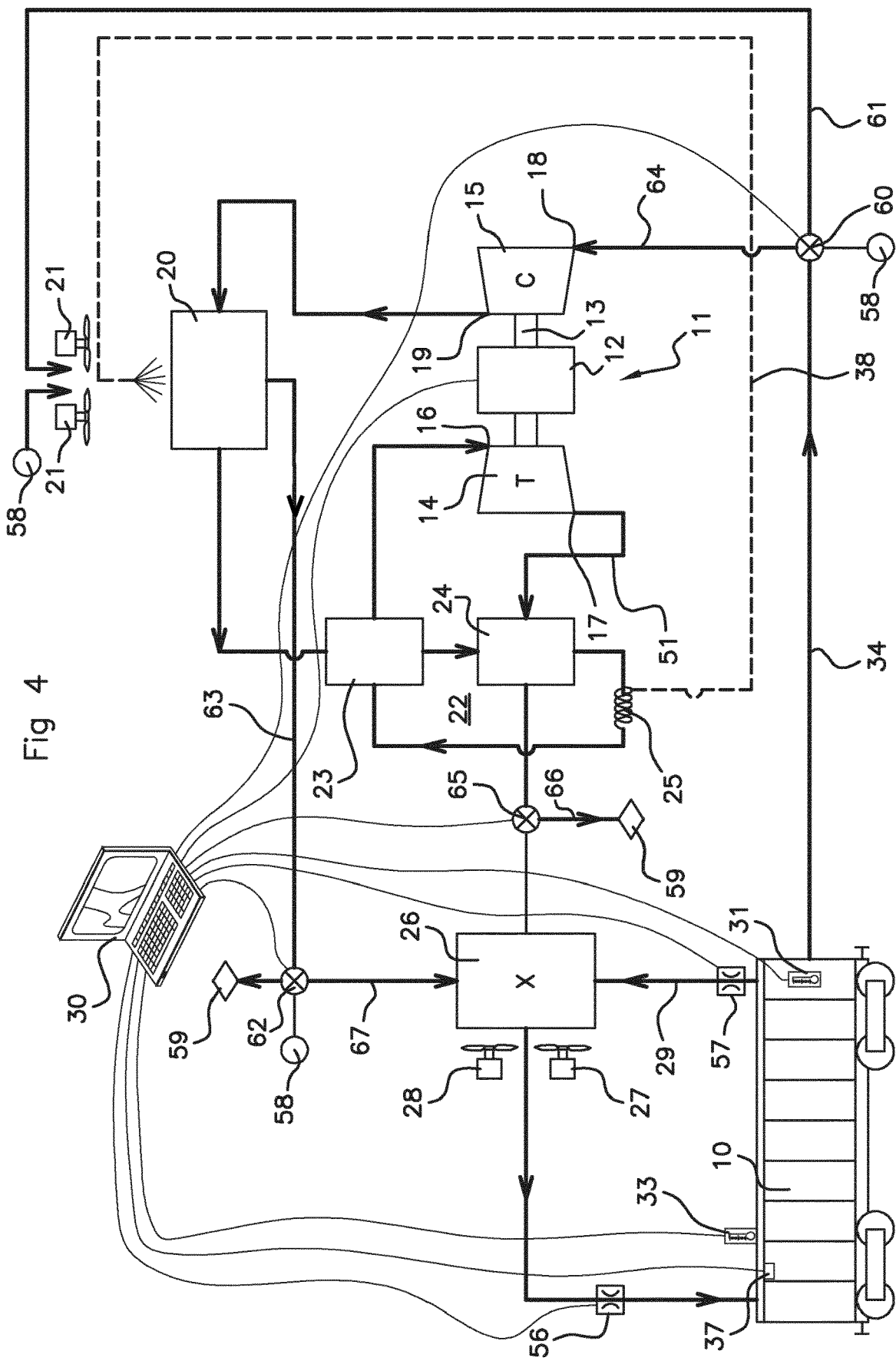
FIG. 4 is an operating diagram of the air cycle device of FIG. 3 in the heating mode.

The second embodiment shown in FIGS. 3 and 4 differs from the first embodiment in that it allows the cabin heat exchanger 32 to be omitted, the intermediate exchanger 20 being used for heating. Furthermore, this second embodiment likewise allows the number of valves to be reduced.

The three-way valve 40 at the inlet 18 of the compressor 15 of the first embodiment is replaced by a four-way valve 60 connected to an external fresh air inlet 58, to the conduit 34 drawing air from the cabin 10, by a conduit 64 to the inlet 18 of the compressor 15 and to a conduit 61 which connects it to the inlet of the second circuit of the intermediate exchanger 20. The valve 55 at the inlet of the mixing chamber 26 of the first embodiment is replaced by a four-way valve 62 connected to an external fresh air inlet 58, to a conduit 63 connected to the outlet of the second circuit of the intermediate exchanger 20, to an air outlet 59 out of the cabin 10, and by a conduit 67 to the inlet of the mixing chamber 26. The valve 49 at the outlet of the condenser 24 of the first embodiment is replaced by a three-way valve 65 having an outlet to the mixing chamber 26 and another outlet to an orifice 59 for venting the air out of the cabin 10.

In the cooling mode, the control unit 30 places the different controlled valves 60, 62, 65 in the state shown in FIG. 3. The operation is similar to the cooling mode of the first embodiment.

The valve 60 connects the air inlet 18 of the compressor 15 to the external fresh air inlet 58 at the dynamic pressure resulting from the movement of the vehicle at a pressure greater than atmospheric pressure. It likewise connects the conduit 34 from the cabin 10 to the conduit 61 in communication with the second circuit of the intermediate exchanger 20.

The air outlet 19 of the compressor 15 supplies the first circuit of the intermediate exchanger 20 which forms the hot pass of this intermediate exchanger 20, the compressed airflow heated by the compressor 15 being cooled in this intermediate exchanger 20 by the airflow circulating in the second circuit of the intermediate exchanger 20 which forms the cold pass thereof. The second air circuit of the intermediate exchanger 20 is supplied by an air stream driven by at least one electric fan 21. This air stream can be selected from an external air stream 58 drawn from outside the vehicle at ambient temperature, an air stream vented from the cabin 10 via the conduit 34, and mixtures thereof. The air stream passing into the second air circuit of the intermediate exchanger 20 is thus at a temperature between the temperature outside the vehicle and the temperature prevailing in the cabin 10. After passing into the second air circuit of the intermediate exchanger 20, this air stream is supplied via the conduit 63 to the valve 62 which places it in communication with the outlet orifice 59 such that this airflow is ejected to the outside. The intermediate exchanger 20 is thus, in this cooling mode, an intermediate exchanger 20 cooling the compressed air delivered by the compressor 15.

The airflow which is compressed and cooled at the outlet of the first circuit of the intermediate exchanger 20 follows the same circuit as in the first embodiment as far as the valve 65 which delivers the cooled airflow to the mixing chamber 26.

The expansion in the turbine 14 once again allows mechanical work to be created which is added to that of the electric motor 12 to rotationally drive the compressor 15 and to trigger the start-up cycle. The turbine 14 thus allows the mechanical work delivered to the compressor 15 to be increased, the rotational speed of the motor 12 being adjusted by the control unit 30 to obtain a temperature value at the outlet of the turbine 14 which is appropriate for cooling the air of the cabin 10, typically of the order of −10° C.

The valve 65 is open such that the air exiting the turbine 14 supplies the mixing chamber 26 via the second circuit of the condenser 24. The valve 62 is assumed to be closed between the fresh air inlet 58 and the mixing chamber 26 for the nominal operating point. It can be opened to a greater or lesser extent based on an amount of external fresh airflow 58 necessary for supplying the cabin with dioxygen.

The mixing chamber 26 is likewise supplied with recirculation air from the cabin via the conduit 29 by the fans 27, 28 which likewise supply the cabin 10 with air from the mixing chamber 26.

Therefore, in the cooling mode, the air cycle device performs an air cycle with a direct open loop from the motorised turbocompressor 11. The pressure in the loop corresponds to that delivered by the compressor 15, greater than atmospheric pressure, typically of the order of 3 10$^5$ Pa.

In contrast, in the heating mode the operation of the air cycle device in accordance with the second embodiment is different from that of the first embodiment. In the heating mode, the control unit 30 places the different controlled valves 60, 62, 65 in the state shown in FIG. 4.

The valve 60 receives air at the conduit 34 from the cabin 10 and directs a portion of this air, corresponding to the airflow to be vented from the cabin to the outside in order to renew air in the cabin, to the air inlet 18 of the compressor 15 via the conduit 64. This airflow follows the same circuit as in the cooling mode but, at the outlet of the second circuit of the condenser 24, the valve 65 directs this airflow to the outlet orifice 59 to eject it to the outside of the vehicle.

The air from the second circuit of the intermediate exchanger 20 has been heated by the compressed airflow delivered by the compressor 15 in the first circuit of this intermediate exchanger 20. This heated airflow delivered in the conduit 63 is directed by the valve 62 to the inlet of the mixing chamber 26 to produce the calories allowing heating of the cabin. This heated airflow comes from the airflow supplied to the inlet of the second circuit of the intermediate exchanger 20 which can be formed from a fresh airflow from an external fresh air inlet 58 and/or a recirculation airflow from the cabin via the conduit 61 and the valve 60.

Thus, in this second embodiment, in the heating mode, the main air circuit flowing in the turbocompressor 11 and an airflow ejected to the outside, which can correspond to the airflow to be extracted from the cabin 10 for renewal of dioxygen in the cabin 10, and which serves to heat the airflow supplying the mixing chamber 26 and thus the cabin owing to the intermediate exchanger 20 which acts as a heat exchanger.

It should be noted that in a variant, not shown, of this second embodiment, the air inlet 18 of the compressor 15 can be supplied directly by drawing air specifically from the cabin 10 e.g. for ejecting foul air to the outside, along a different conduit from the recirculation and heating air passing into the second circuit of the intermediate exchanger 20.

Table 3 below shows, by way of non-limiting example, different typical values for flow rate, pressure and temperature at the air inlets and outlets of the turbine 14 of the compressor 15 of the turbocompressor 11 which can be obtained in the second embodiment of the invention in the heating mode.

TABLE 3

| | Parameters | | |
| --- | --- | --- | --- |
| Heating mode | Temperature | Pressure (10$^5$ Pa) | Flow rate |
| Compressor inlet | 20° C. | 1 | 0.3 kg/s |
| Compressor outlet | 130° C. | 2.5 | 0.3 kg/s |
| Turbine inlet | 30° C. | 2.45 | 0.3 kg/s |
| Turbine outlet | −20° C. | 1 | 0.3 kg/s |

In the cooling mode, the values shown in table 1 above for the first embodiment can be obtained in a similar manner with the second embodiment.

An air cycle device of a vehicle in accordance with the invention can be in particular in the form of an air conditioning assembly (ECS) which is compact and is in one piece integrating all of its components.

A single air conditioning assembly ECS of a vehicle in accordance with the invention can comprise:

several air cycle devices, each air cycle device having at least one turbocompressor and at least one set of heat exchangers for at least one air circuit;

or a single air cycle device comprising a single air circuit and a single set of heat exchangers and a plurality of turbocompressors, the different turbocompressors being in fluid communication with this same air circuit;

or a single air cycle device with a single turbocompressor in fluid communication with a plurality of air circuits and a plurality of sets of heat exchangers or a single air cycle device having a single turbocompressor in fluid communication with a single air circuit comprising a single set of heat exchangers.

A number of such reversible air conditioning assemblies (ECS) can be provided on-board a surface vehicle in accordance with the invention based on the hot or cold thermal power required in the cabin 10. The same air conditioning assembly ECS can be used in extremely diverse surface vehicles in accordance with the invention, for applications in very hot and/or very humid areas or, in contrast, very cold and/or very dry areas. A surface vehicle in accordance with the invention comprising a plurality of air cycle devices and/or a plurality of air conditioning assemblies likewise enables the environmental control function in the cabin 10 to be at least partially maintained in the event of a breakdown of one of the air cycle devices and/or one of the air conditioning assemblies. It should be noted in particular that it is possible to increase the rotational speed of all the other turbocompressors to overcome the deficiency of one of the turbocompressors if the size of the installation is such that the nominal rotational speed in operation of the different turbocompressors is less than their maximum speed.

A vehicle in accordance with the invention having a plurality of air cycle devices likewise advantageously comprises a central controlling unit allowing the different air cycle devices and their respective control units to be controlled. There is nothing to prevent provision being made that the functions of the control units of the different air cycle devices are at least partly centralised in such a central controlling unit. Similarly, a vehicle in accordance with the invention having a plurality of air conditioning assemblies advantageously likewise comprises a central controlling unit allowing the different air conditioning assemblies, in particular the different air conditioning assemblies associated with a single cabin 10 of the vehicle, to be controlled.

It goes without saying that the invention can be varied in a large number of ways with respect to the embodiment described above and illustrated in the figures. In particular, at least one two-phase or liquid heat transfer fluid cooling loop can be associated in series or in parallel on at least one air circuit of at least one air cycle device and/or at least one air conditioning assembly ECS of a vehicle in accordance with the invention, for cooling heat sources on-board the vehicle, e.g. electric or electronic power circuits.

The invention can be applied most particularly advantageously to a rail vehicle, in particular for passenger transporting trains. However, it can be applied to any other surface vehicles in which the same technical problems arise, in particular wheel-borne vehicles (cars, buses, trucks, . . . ) and vehicles moving across the water (ships).

The invention can cover numerous variants and applications other than those described above. In particular, it goes without saying that, unless stated otherwise, the different structural and functional features of each of the embodiments described above do not have to be considered as being combined and/or closely and/or inextricably linked with each other, but in contrast considered as simple juxtapositions. Furthermore, the structural and/or functional features of the different embodiments described above can form, in their entirety or in part, any different juxtaposition or any different combination.

The invention claimed is:

1. Method for supplying air at a controlled temperature to a cabin of a surface vehicle in which at least one air cycle device is used, comprising:
    at least one turbocompressor comprising:
        a rotating compressor,
        a rotating turbine,
        a shaft coupling the turbine and the compressor such that the turbine is able to rotationally drive the compressor,
        an air inlet of the compressor,
        an air outlet of the compressor delivering an airflow compressed by the compressor,
        an air inlet of the turbine arranged to receive a compressed airflow from the compressor,
        an air outlet of the turbine delivering an expanded cold airflow,
    at least one exchanger interposed between the air outlet of the compressor of at least one turbocompressor and the air inlet of the turbine of at least one turbocompressor,
wherein:
    use is made of at least one turbocompressor of at least one air cycle device comprising an electric motor coupled to the compressor so as to be able to deliver mechanical power to the compressor,
    the air inlet of the compressor of at least one turbocompressor of at least one air cycle device is arranged to receive air at a pressure greater than or equal to atmospheric pressure,
    each turbocompressor of each air cycle device is associated with a set of controlled valves and conduits, adapted to be able to be controlled in one operating mode selected at least from:
        a heat pump heating mode in which:
            the air inlet of the compressor is arranged to receive an expanded airflow from the turbine via at least one heat exchanger, named intermediate heating exchanger, adapted to heat the expanded air delivered by the turbine in contact with at least one air stream selected from an external air stream, a foul air stream to be vented out of the cabin, and mixtures thereof,
            the compressed and heated air delivered to the outlet of the compressor of the turbocompressor passes through a first circuit of a heat exchanger, named cabin heat exchanger, adapted to heat an airflow for supply to the cabin of the vehicle passing through a second circuit of the cabin heat exchanger, an outlet of the first circuit of the cabin heat exchanger being connected to the air inlet of the turbine,
        a cooling mode in which:
            the air inlet of the compressor is arranged to receive air external to the vehicle,
            the compressed air outlet of the compressor is connected to at least one heat exchanger, named intermediate exchanger, delivering a compressed air stream cooled by at least one air stream selected from an external air stream, a foul air stream to be vented out of the cabin, and mixtures thereof.

2. Method according to claim 1, wherein the turbine of each turbocompressor is arranged to deliver an expanded airflow at a pressure greater than or equal to atmospheric pressure.

3. Method according to claim 1, wherein, in the cooling mode, the expanded cold airflow delivered by the air outlet of the turbine is introduced into the cabin of the vehicle.

4. Method according to claim 1, wherein, in the heating mode, said airflow for supply to the cabin of the vehicle is formed by at least one air stream selected from an external air stream, a recirculation air stream from the cabin of the vehicle, and mixtures thereof.

5. Method according to claim 1, wherein said set of controlled valves and conduits is adapted to be able to be likewise controlled in an operating mode selected from a heating mode in which:
    a foul air stream to be vented out of the cabin is supplied to the inlet of the compressor of the turbocompressor,
    the compressed and heated air delivered to the outlet of the compressor of the turbocompressor passes through at least one exchanger interposed between the air outlet of the compressor of at least one turbocompressor and the air inlet of the turbine of the turbocompressor, and the air delivered to the outlet of the turbine of the turbocompressor is connected to an outlet orifice to be ejected to the outside.

6. Method according to claim 1, wherein the rotational speed of the electric motor of each turbocompressor is controlled based on a set thermal power to be delivered to the cabin of the vehicle.

7. Method according to claim 1, wherein the moisture of the compressed air delivered to the air inlet of the turbine is extracted upstream of this air inlet.

8. Method according to claim 7, wherein the moisture is extracted by a moisture extraction loop comprising a first circuit of a heating heat exchanger receiving the compressed air stream from the intermediate cooling exchanger, a first circuit of a condensing heat exchanger, a liquid water extraction device, a second circuit of the heating heat exchanger receiving the airflow delivered downstream of the liquid water extraction device to heat it by the compressed airflow supplying the first circuit of the heating heat exchanger, and a second circuit of the condensing heat exchanger receiving the expanded cold airflow delivered by the air outlet of the turbine to cool the compressed airflow passing through the first circuit of the condensing heat exchanger so as to condense the moisture present in this compressed airflow.

9. Surface vehicle comprising at least one air cycle device, comprising:
at least one turbocompressor comprising:
a rotating compressor,
a rotating turbine,
a shaft coupling the turbine and the compressor such that the turbine is able to rotationally drive the compressor,
an air inlet of the compressor,
an air outlet of the compressor delivering an airflow compressed by the compressor,
an air inlet of the turbine arranged to receive a compressed airflow from the compressor,
an air outlet of the turbine delivering an expanded cold airflow,
at least one exchanger interposed between the air outlet of the compressor of at least one turbocompressor and the air inlet of the turbine of at least one turbocompressor,
wherein:
at least one turbocompressor of at least one air cycle device comprises an electric motor coupled to the compressor so as to be able to deliver mechanical power to the compressor,
the air inlet of the compressor of at least one turbocompressor of at least one air cycle device is arranged to receive air at a pressure greater than or equal to atmospheric pressure,
each turbocompressor of each air cycle device is associated with a set of controlled valves and conduits, adapted to be able to be controlled in one operating mode selected at least from:
a heat pump heating mode in which:
the air inlet of the compressor is arranged to receive an expanded airflow from the turbine via at least one heat exchanger, named intermediate heating exchanger, adapted to heat the expanded air delivered by the turbine in contact with at least one air stream selected from an external air stream, a foul air stream to be vented out of the cabin, and mixtures thereof,
the compressed and heated air delivered to the outlet of the compressor of the turbocompressor passes through a first circuit of a heat exchanger, named cabin heat exchanger, adapted to heat an airflow for supply to the cabin of the vehicle passing through a second circuit of the cabin heat exchanger, an outlet of the first circuit of the cabin heat exchanger being connected to the air inlet of the turbine,
a cooling mode in which:
the air inlet of the compressor is arranged to receive air external to the vehicle,
the compressed air outlet of the compressor is connected to at least one heat exchanger, named intermediate exchanger, delivering a compressed air stream cooled by at least one air stream selected from an external air stream, a foul air stream to be vented out of the cabin, and mixtures thereof.

10. Vehicle according to claim 9, wherein the turbine of each turbocompressor is arranged to deliver an expanded airflow at a pressure greater than or equal to atmospheric pressure.

11. Vehicle according to claim 9, wherein each air cycle device comprises a set of controlled valves and conduits, and in that it comprises at least one control unit adapted to be able to control each air cycle device in an operating mode selected from:
a heating mode in which compressed and heated air delivered to the outlet of the compressor of the turbocompressor passes through at least one first circuit of a heat exchanger adapted to heat an airflow for supply to the cabin of the vehicle,
a cooling mode in which:
the air inlet of the compressor is arranged to receive air external to the vehicle,
the compressed air outlet of the compressor is connected to at least one heat exchanger, named intermediate cooling exchanger, delivering a compressed air stream cooled by at least one air stream selected from an external air stream, a foul air stream to be vented out of the cabin, and mixtures thereof.

12. Vehicle according to claim 9, wherein said vehicle comprises a control unit adapted to control the rotational speed of the electric motor of each turbocompressor based on a set thermal power to be delivered to the cabin of the vehicle.

13. Vehicle according to claim 9, wherein said set of controlled valves and conduits is adapted to be able to be likewise controlled in an operating mode selected from a heating mode in which:
a foul air stream to be vented out of the cabin is supplied to the inlet of the compressor of the turbocompressor,
the compressed and heated air delivered to the outlet of the compressor of the turbocompressor passes through at least one exchanger interposed between the air outlet of the compressor of at least one turbocompressor and the air inlet of the turbine of the turbocompressor,
and the air delivered to the outlet of the turbine of the turbocompressor is connected to an outlet orifice to be ejected to the outside.

* * * * *